(12) United States Patent
Harada et al.

(10) Patent No.: US 9,709,796 B2
(45) Date of Patent: Jul. 18, 2017

(54) OBJECTIVE LENS FOR ENDOSCOPES AND ENDOSCOPE

(71) Applicant: FUJIFILM Corporation, Tokyo (JP)

(72) Inventors: Keisuke Harada, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/099,672

(22) Filed: Apr. 15, 2016

(65) Prior Publication Data

US 2016/0306161 A1    Oct. 20, 2016

(30) Foreign Application Priority Data

Apr. 20, 2015 (JP) .................... 2015-085867

(51) Int. Cl.
| | |
|---|---|
| G02B 23/24 | (2006.01) |
| G02B 13/00 | (2006.01) |
| G02B 13/04 | (2006.01) |
| G02B 9/12 | (2006.01) |
| G02B 13/06 | (2006.01) |

(52) U.S. Cl.
CPC .......... *G02B 23/243* (2013.01); *G02B 13/06* (2013.01)

(58) Field of Classification Search
CPC .............................. G02B 23/243; G02B 13/06
USPC ........................................................ 359/656
See application file for complete search history.

(56) References Cited

U.S. PATENT DOCUMENTS

| | | | | |
|---|---|---|---|---|
| 7,180,686 B2* | 2/2007 | Kato | ....................... | G02B 13/06 |
| | | | | 359/740 |
| 7,502,182 B2* | 3/2009 | Miyano | .................... | G02B 9/12 |
| | | | | 359/434 |
| 8,237,842 B2* | 8/2012 | Wakamiya | ............... | G02B 9/62 |
| | | | | 348/335 |
| 9,372,336 B2* | 6/2016 | Murata | ................ | G02B 23/243 |
| 2009/0086017 A1 | 4/2009 | Miyano | | |

FOREIGN PATENT DOCUMENTS

| | | |
|---|---|---|
| JP | H09-269450 A | 10/1997 |
| JP | 3574484 B2 | 10/2004 |
| JP | 2009-080413 A | 4/2009 |

* cited by examiner

*Primary Examiner* — Bumsuk Won
*Assistant Examiner* — Grant Gagnon
(74) *Attorney, Agent, or Firm* — Studebaker & Brackett PC

(57) ABSTRACT

An objective lens for endoscopes includes, in order from the object side: a front group; an aperture stop; and a positive rear group. The front group includes, in order from the object side, a negative first lens, in which the absolute value of the radius of curvature of the surface toward the image side is less than that of the surface toward the object side, and at least one plane parallel plate. The rear group includes, in order from the object side, a positive second lens, and a cemented lens formed by a positive third lens and a negative fourth lens. The coupling surface of the cemented lens is convex toward the image side. Conditional Formulae (1) through (3) concerning the plane parallel plates within the front group, the focal length of the first lens, the radius of curvature of the coupling surface of the cemented lens, etc., are satisfied.

14 Claims, 12 Drawing Sheets

EXAMPLE 1

EXAMPLE 1

FIG.2 EXAMPLE 2

FIG.3 EXAMPLE 3

FIG.4 EXAMPLE 4

FIG.5 EXAMPLE 5

FIG.8 EXAMPLE 2

OBJECTIVE LENS FOR ENDOSCOPES AND ENDOSCOPE

CROSS REFERENCE TO RELATED APPLICATIONS

The present application claims priority under 35 U.S.C. §119 to Japanese Patent Application No. 2015-085867 filed on Apr. 20, 2015. The above application is hereby expressly incorporated by reference, in its entirety, into the present application.

BACKGROUND

The present disclosure is related to an objective lens for endoscopes and to an endoscope equipped with the objective lens for endoscopes.

Conventionally, endoscopes of the insertion type, in which an elongate insertion portion having an imaging device built in at the distal end portion thereof is inserted through the mouth or the nose of a patient to image the interiors of body cavities, are in common use in the medical field. Known objective lenses which are utilizable in such endoscopes are disclosed in Japanese Unexamined Patent Publication No. H9(1997)-269450, Japanese Patent No. 3574484, and Japanese Unexamined Patent Publication No. 2009-080413, for example. Japanese Unexamined Patent Publication No. H9(1997)-269450 and Japanese Patent No. 3574484 disclose lens systems having four lenses, and Japanese Unexamined Patent Publication No. 2009-080413 discloses lens systems in which the number of lenses is within a range from four to six.

SUMMARY

It is desired for endoscopes to become thinner in diameter and compact, in order to lessen the burden on patients. Therefore, compact configurations are desired in objective lenses for endoscopes as well. Further, it is necessary for objective lenses for endoscopes to be wide angle lens systems that enable observation of a wide range, in order to improve the detection rate of diseased portions. Recently, a further widening of the angle of view is desired.

However, the objective lenses for endoscopes disclosed in Japanese Unexamined Patent Publication No. H9(1997)-269450 and Japanese Patent No. 3574484 have long total lengths, and the angles of view thereof are narrow. The objective lenses for endoscopes disclosed in Japanese Unexamined Patent Publication No. 2009-080413 have wider angles of view than the objective lenses for endoscopes disclosed in Japanese Unexamined Patent Publication No. H9(1997)-269450 and Japanese Patent No. 3574484. However, recently, lens systems having even wider angles of view are in demand.

In addition, lateral chromatic aberration generally becomes greater as the angle of view becomes wider. If the increase in the numbers of pixels in imaging elements which are mounted in recent electronic endoscopes is considered, there is demand for a lens system having favorable optical performance, in which various aberrations including lateral chromatic aberration are corrected.

The present disclosure has been developed based on the foregoing circumstances. The present disclosure provides an objective lens for endoscopes having a compact configuration and a wide angle of view, that suppresses various aberrations including lateral chromatic aberration and has favorable optical performance. The present disclosure also provides an endoscope equipped with this objective lens for endoscopes.

An objective lens for endoscopes of the present disclosure consists of; in order from the object side to the image side:
a front group;
an aperture stop; and
a rear group having a positive refractive power as a whole;
the front group consisting of, in order from the object side to the image side, a first lens having a negative refractive power, in which the absolute value of the radius of curvature of the surface toward the image side thereof is less than the absolute value of the radius of curvature of the surface toward the object side thereof, and at least one plane parallel plate;
the rear group consisting of, in order from the object side to the image side, a second lens having a positive refractive power, a third lens having a positive refractive power, and a fourth lens having a negative refractive power;
the third lens and the fourth lens being cemented together to constitute a cemented lens;
the coupling surface of the cemented lens being convex toward the image side; and
all of Conditional Formulae (1) through (3) below being satisfied.

$$0.045 < \frac{1}{f}\sum_{i=1}^{k}\frac{ti \times (Ndi-1)}{vdi} < 0.15 \quad (1)$$

$$-0.9 < f/f1 < -0.5 \quad (2)$$

$$-2.9 < Dsc/RC < -1 \quad (3)$$

wherein f is the focal length of the entire lens system, k is the total number of plane parallel plates within the front group, i is a natural number within a range from 1 to k, ti is the thickness of an ith plane parallel plate from the object side within the front group, Ndi is the refractive index with respect to the d line of an ith plane parallel plate from the object side within the front group, vdi is the Abbe's number with respect to the d line of an ith plane parallel plate from the object side within the front group, f1 is the focal length of the first lens, Dsc is the distance along the optical axis from the aperture stop to the coupling surface of the cemented lens, and RC is the radius of curvature of the coupling surface of the cemented lens.

In the objective lens for endoscopes of the present disclosure, it is preferable for Conditional Formula (1-1) below to be satisfied.

$$0.05 < \frac{1}{f}\sum_{i=1}^{k}\frac{ti \times (Ndi-1)}{vdi} < 0.12 \quad (1-1)$$

In the objective lens for endoscopes of the present disclosure, it is preferable for Conditional Formula (2-1) below to be satisfied.

$$-0.8 < f/f1 < -0.6 \quad (2-1)$$

In the objective lens for endoscopes of the present disclosure, it is preferable for Conditional Formula (3-1) below to be satisfied.

$$-2.7 < Dsc/RC < -1.2 \quad (3-1)$$

In the objective lens for endoscopes of the present disclosure, it is preferable for Conditional Formula (4) below to be satisfied, and more preferable for Conditional Formula (4-1) below to be satisfied.

$$2.5 \text{ mm} < \sum_{i=1}^{k} Ndi \times ti < 6 \text{ mm} \quad (4)$$

$$2.8 \text{ mm} < \sum_{i=1}^{k} Ndi \times ti < 5.5 \text{ mm} \quad (4\text{-}1)$$

wherein the symbols k, i, Ndi, and ti represent the same items as those described above, and mm is millimeters as a unit of length.

In the objective lens for endoscopes of the present disclosure, it is preferable for Conditional Formula (5) below to be satisfied, and more preferable for Conditional Formula (5-1) below to be satisfied.

$$0.8 < \frac{1}{f} \sum_{i=1}^{k} \frac{ti}{Ndi} < 3 \quad (5)$$

$$1 < \frac{1}{f} \sum_{i=1}^{k} \frac{ti}{Ndi} < 2 \quad (5\text{-}1)$$

wherein the symbols f, k, i, Ndi, and ti represent the same items as those described above.

In the objective lens for endoscopes of the present disclosure, it is preferable for the first lens and the plane parallel plate provided most toward the object side to be configured to be separable from optical members toward the image side of the plane parallel plate provided most toward the object side.

In addition, in the objective lens for endoscopes of the present disclosure, it is preferable for the first lens to have a planar portion, and for the planar portion to abut the plane parallel plate provided most toward the object side in the direction of the optical axis. In this case, it is preferable for Conditional Formula (6) below to be satisfied, and more preferable for Conditional Formula (6-1) below to be satisfied.

$$0.4 < (R2-D2)/f < 1 \quad (6)$$

$$0.5 < (R2-D2)/f < 0.85 \quad (6\text{-}1)$$

wherein R2 is the radius of curvature of the lens surface of the first lens toward the image side, and D2 is the air distance along the optical axis between the first lens and the plane parallel plate provided most toward the object side.

In the objective lens for endoscopes of the present disclosure, the front group may only have two plane parallel plates.

An endoscope of the present disclosure is equipped with the objective lens for endoscopes of the present disclosure.

Note that the term "essentially" in the expression "constituted essentially by . . . " in the present specification means that, besides the constituent elements listed, lenses that practically do not have any power, optical elements other than lenses such as a stop and a cover glass, as well as lens flanges, a lens barrel, etc., may be included.

Note that the symbols of the refractive powers, the surface shapes, and radii of curvature of the lenses above are those in the paraxial region for lenses that include aspherical surfaces. In addition, the signs of the radii of curvature are positive for shapes which are convex toward the object side, and negative for shapes which are convex toward the image side. In addition, the focal lengths described above are those with respect to the d line (wavelength: 587.6 nm).

According to the present disclosure, the configuration of each optical element is favorably set in a lens system with four lenses that includes plane parallel plates. Further, conditional formulae related to the material and thickness of the plane parallel plates, the focal length of the lens provided most toward the object side, and the coupling surface of the cemented lens are satisfied. Therefore, an objective lens for endoscopes having a compact configuration and a wide angle of view, that suppresses various aberrations including lateral chromatic aberration and realizes favorable optical performance, as well as an endoscope equipped with this objective lens for endoscopes, can be provided.

DETAILED DESCRIPTION OF THE PREFERRED EMBODIMENTS

Figure 1:
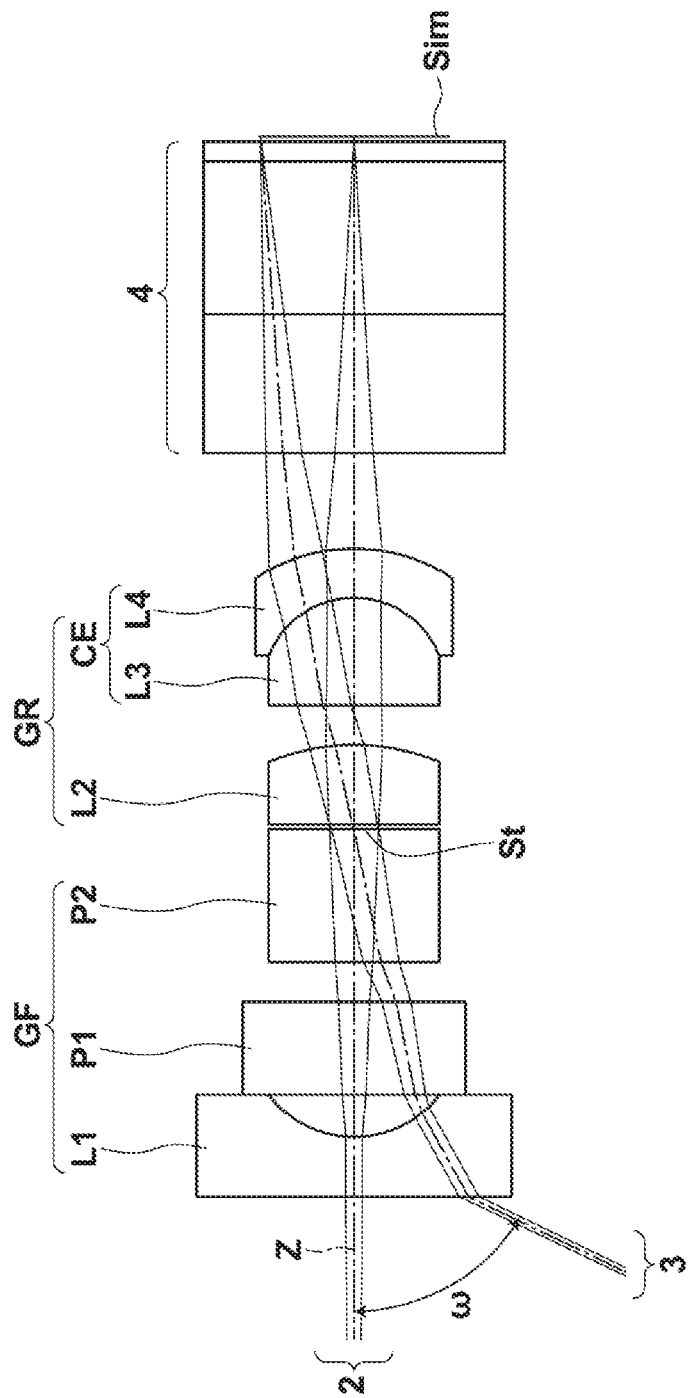
FIG. 1 is a sectional diagram that illustrates the configuration of an objective lens for endoscopes of Example 1 of the present disclosure and the paths of light rays that pass therethrough.

Hereinafter, embodiments of the present disclosure will be described in detail with reference to the attached drawings. FIG. 1 through FIG. 5 are cross sectional diagrams that illustrate the configurations of objective lenses for endoscopes according to embodiments of the present disclosure and the paths of light beams that pass therethrough, which respectively correspond to Examples 1 through 5 to be described later. The basic configurations of the examples illustrated in FIG. 1 through FIG. 5 and the manners in which they are illustrated are the same. Therefore, a description will be given below with reference mainly to FIG. 1. In FIG. 1, the left side of the drawing sheet is the object side, the right side of the drawing sheet is the image side, optical paths are illustrated for an axial light beam 2 and an off axis light beam 3 at a maximum angle of view, and the half value a, of the maximum full angle of view is also illustrated.

This objective lens for endoscopes is constituted by, in order from the object side to the image side along an optical axis Z, a front group GF having a negative refractive power as a whole, an aperture stop St, and a rear group GR having a positive refractive power as a whole. By arranging a negative lens group and a positive lens group in this order from the object side to the image side, the refractive power arrangement is of the retro focus type, which enables a widening of the angle of view.

FIG. 1 illustrates an example in which an optical member 4 having a light input surface and a light output surface that are parallel to each other is provided between the rear group GR and an image formation plane Sim. The optical member 4 presumes the presence of an optical path converting prism for bending optical paths, filters, a cover glass, and the like. A configuration from which the optical member 4 is omitted is also possible in the objective lens for endoscopes of the present disclosure. Note that in the case that an optical path converting prism is employed, optical paths will become bent. However, FIG. 1 is a diagram in which optical paths are expanded, in order to facilitate understanding.

The front group GF is constituted by, in order from the object side to the image side, a first lens L1 having a negative refractive power, and at least one plane parallel plate. The front group GF illustrated in FIG. 1 is constituted by the first lens L1, and two plane parallel plates P1 and P2.

The first lens L1 is configured such that absolute value of the radius of curvature of the surface toward the image side thereof is less than the absolute value of the radius of curvature of the surface toward the object side thereof. Adopting such a shape is advantageous from the viewpoint of widening the angle of view.

In this objective lens for endoscopes, the plane parallel plates are positioned at the object side of the aperture stop St. Therefore, the heights of the points at which rays of light at peripheral angles of view intersect with the surface of the first lens L1 toward the object side with respect to the optical axis Z can be decreased, which is advantageous from the viewpoint of miniaturizing the first lens L1. In addition, an advantageous effect that a difference in the optical path lengths of the plane parallel plates with respect to the F line (wavelength: 486.1 nm) and the C line (wavelength: 656.3 nm) enables lateral chromatic aberration to be corrected is obtained. The plane parallel plates impart the above operational effects, while not having any paraxial refractive power. Therefore, the influence on optical performance which is imparted in the case that eccentricities occur is less than that of a lens. Specifically, no deterioration in images will be generated in the case that parallel eccentricity of the plane parallel plates occurs, and the tolerance for inclination error can be greater than that for a lens. For these reasons, assembly is facilitated, and the plane parallel plates contribute to a realization of favorable optical performance. Note that here, parallel eccentricity refers to movement in a direction perpendicular to the optical axis Z, and inclination refers to rotation within a cross section that includes the optical axis Z.

The rear group GR is a lens group having a positive refractive power as a whole. Thereby, it becomes possible to maintain the refractive power of the entire lens system to be positive. The rear group GR is constituted essentially by, in order from the object side to the image side, a second lens L2 having a positive refractive power, a third lens L3 having a positive refractive power, and a fourth lens L4 having a negative refractive power. The third lens L3 and the fourth lens L4 are cemented together to constitute a cemented lens CE.

Distributing the positive refractive power of the rear group GR in the manner described above is advantageous from the viewpoint of correcting spherical aberration and distortion. In addition, by positioning the cemented lens CE at the image side, the heights of peripheral light rays will become high at the coupling surface of the cemented lens CE, and favorable correction of both lateral chromatic aberration and longitudinal chromatic aberration will be facilitated.

The cemented lens CE is configured such that the coupling surface thereof is convex toward the image side. By adopting this configuration, the generation of astigmatism can be suppressed, and correction of spherical aberration will be facilitated.

This objective lens for endoscopes is configured such that all of Conditional Formulae (1) through (3) are satisfied.

$$0.045 < \frac{1}{f}\sum_{i=1}^{k} \frac{ti \times (Ndi-1)}{vdi} < 0.15 \quad (1)$$

$$-0.9 < f/f1 < -0.5 \quad (2)$$

$$-2.9 < Dsc/RC < -1 \quad (3)$$

wherein f is the focal length of the entire lens system, k is the total number of plane parallel plates within the front group, i is a natural number within a range from 1 to k, ti is the thickness of an ith plane parallel plate from the object side within the front group, Ndi is the refractive index with respect to the d line of an ith plane parallel plate from the object side within the front group, vdi is the Abbe's number with respect to the d line of an ith plane parallel plate from the object side within the front group, f1 is the focal length of the first lens, Dsc is the distance along the optical axis from the aperture stop to the coupling surface of the cemented lens, and RC is the radius of curvature of the coupling surface of the cemented lens.

If the refractive index of an ith plane parallel plate with respect to the F line is designated as NFi and the refractive index of an ith plane parallel plate with respect to the C line is designated as NCi, the physical amount of Conditional Formula (1) may be rewritten as follows.

$$\frac{1}{f}\sum_{i=1}^{k}\frac{ti \times (Ndi - 1)}{vdi} = \frac{1}{f}\sum_{i=1}^{k} ti \times (NFi - NCi)$$

As can be understood from the above formula, Conditional Formula (1) indicates a favorable range of values for the difference in optical path lengths between the F line and the C line in the plane parallel plates which are normalized by the focal length of the entire lens system. The entrance pupil position of the F line is more toward the object side than the entrance pupil position of the C line. Therefore, the height of a principal ray of light for the F line will be lower than the height of a principal ray of light for the C line in the first lens L1. By configuring the objective lens for endoscopes such that the value of $$\frac{1}{f}\sum_{i=1}^{k}\frac{ti \times (Ndi - 1)}{vdi}$$

is not less than or equal to the lower limit defined in Conditional Formula (1), lateral chromatic aberration which is generated at the first lens L1 can be corrected, and this configuration is also advantageous from the viewpoint of widening the angle of view. Generally, optical materials having high refractive indices and high dispersion have a property that they are likely to absorb light having short wavelengths, that is, poor coloration properties. However, by configuring the objective lens for endoscopes such that the value of $$\frac{1}{f}\sum_{i=1}^{k}\frac{ti \times (Ndi - 1)}{vdi}$$

is not greater than or equal to the upper limit defined in Conditional Formula (1), materials having poor coloration can be avoided, and the thicknesses of the plane parallel plates can be decreased, resulting in the amount of light rays within a short wavelength range being absorbed due to coloration by optical materials being suppressed.

Conditional Formula (2) is related to the refractive power of the first lens L1. By configuring the objective lens for endoscopes such that the value of f/fl is not less than or equal to the lower limit defined in Conditional Formula (2), the refractive power of the first lens L1 can be suppressed. This configuration enables the back focus and the total length of the lens system to be prevented from becoming excessively long. In addition, by configuring the objective lens for endoscopes such that the value of f/fl is not less than or equal to the lower limit defined in Conditional Formula (2), lateral chromatic aberration can be suppressed, and the tolerance of the first lens L1 with respect to parallel eccentricity and inclination errors can be increased. By configuring the objective lens for endoscopes such that the value of f/fl is not greater than or equal to the upper limit defined in Conditional Formula (2), the angles of principal light rays at peripheral angles of view that enter the rear group GR from the front group GF with respect to the optical axis Z can be decreased, which is advantageous from the viewpoint of widening the angle of view.

Conditional Formula (3) is related to the cemented lens CE. Configuring the objective lens for endoscopes such that the value of Dsc/RC is not less than or equal to the lower limit defined in Conditional Formula (3) is advantageous from the viewpoints of correcting longitudinal chromatic aberration and shortening the total length of the lens system. In addition, astigmatism being excessively corrected at high angles of view can be prevented, which is advantageous from the viewpoint of widening the angle of view. Configuring the objective lens for endoscopes such that the value of Dsc/RC is not greater than or equal to the upper limit defined in Conditional Formula (3) is advantageous from the viewpoint of correcting lateral chromatic aberration.

Correcting lateral chromatic aberration is important in order to configure a lens system having a wide angle of view to be compact with a small number of lenses. By selecting the thicknesses and the dispersion of the plane parallel plates which are positioned at the object side of the aperture stop St appropriately such that Conditional Formula (1) is satisfied, by maintaining the refractive power of the first lens L1 such that Conditional Formula (2) is satisfied, and by selecting the position and the radius of curvature of the coupling surface which is positioned at the image side of the aperture stop St such that Conditional Formula (3) is satisfied, lateral chromatic aberration can be favorably suppressed with a small number of lenses.

Note that it is preferable for Conditional Formula (1-1) below to be satisfied, in order to cause the advantageous effects related to Conditional Formula (1) described above to become more prominent.

$$0.05 < \frac{1}{f}\sum_{i=1}^{k}\frac{ti \times (Ndi - 1)}{vdi} < 0.12 \qquad (1\text{-}1)$$

It is preferable for Conditional Formula (2-1) below to be satisfied, in order to cause the advantageous effects related to Conditional Formula (2) described above to become more prominent.

$$-0.8 < f/fl < -0.6 \qquad (2\text{-}1)$$

It is preferable for Conditional Formula (3-1) below to be satisfied, in order to cause the advantageous effects related to Conditional Formula (3) described above to become more prominent.

$$-2.7 < Dsc/RC < -1.2 \qquad (3\text{-}1)$$

Figure 5:
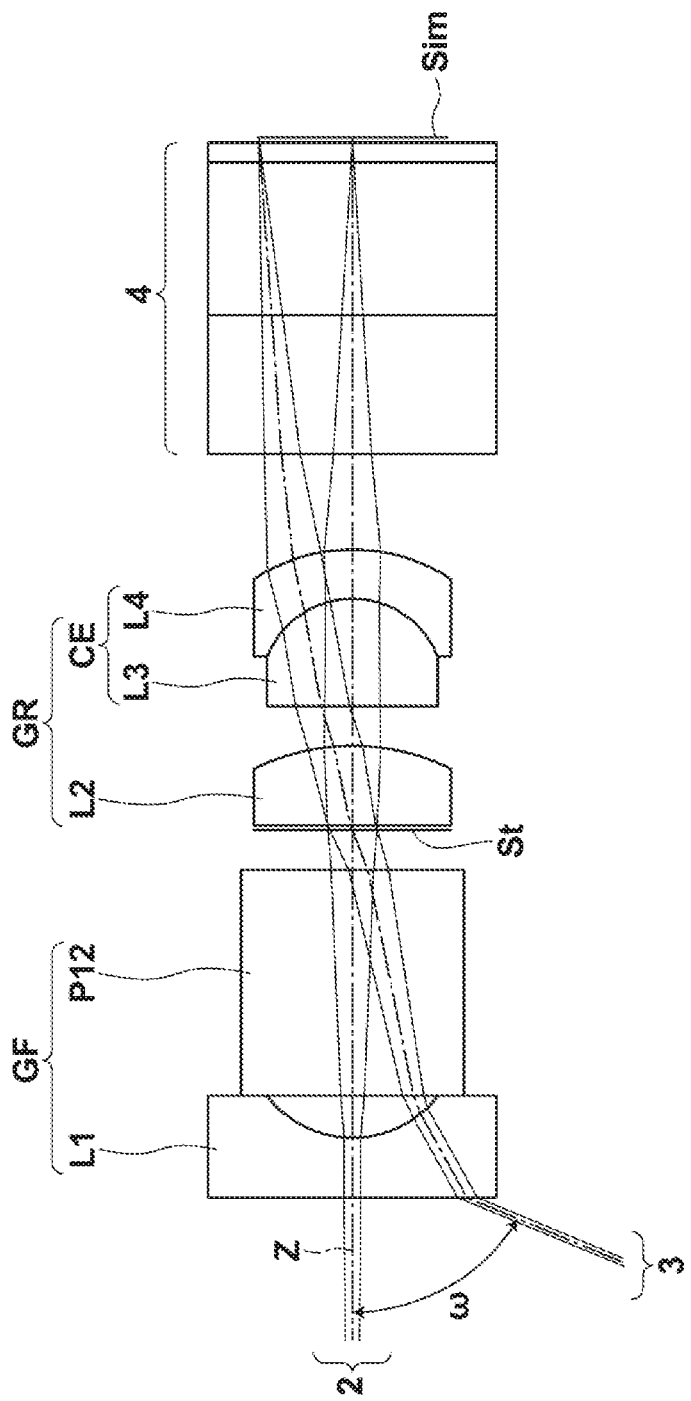
FIG. 5 is a cross sectional diagram that illustrates the configuration of an objective lens for endoscopes of Example 5 of the present disclosure and the paths of light rays that pass therethrough.

Note that the number of plane parallel plates within the front group GF may be selected as desired. In addition, with respect to plane parallel plates formed by the same material, there are no differences in various paraxial amounts and aberration diagrams if the total thickness thereof are equal. That is, the total thickness of the plane parallel plates is important, and the ratio of the thickness of each plane parallel plate is unimportant. Accordingly, with respect to plane parallel plates formed by the same material, the number of plates and the thicknesses thereof may be changed freely if the total thickness of the plane parallel plates is maintained. For example, the number of plates and the thicknesses thereof may be changed as appropriate if favorable in view of the structures and arrangements of mechanical components. FIG. 5 illustrates an example in which the two plane parallel plates P1 and P2 of FIG. 1 are replaced with one plane parallel plate P12. The plane parallel plate P12 and the plane parallel plates P1 and P2 are formed by the same material, and the thickness of the plane parallel plate P12 is the same as the total thickness of the plane parallel plates P1 and P2.

Figure 2:
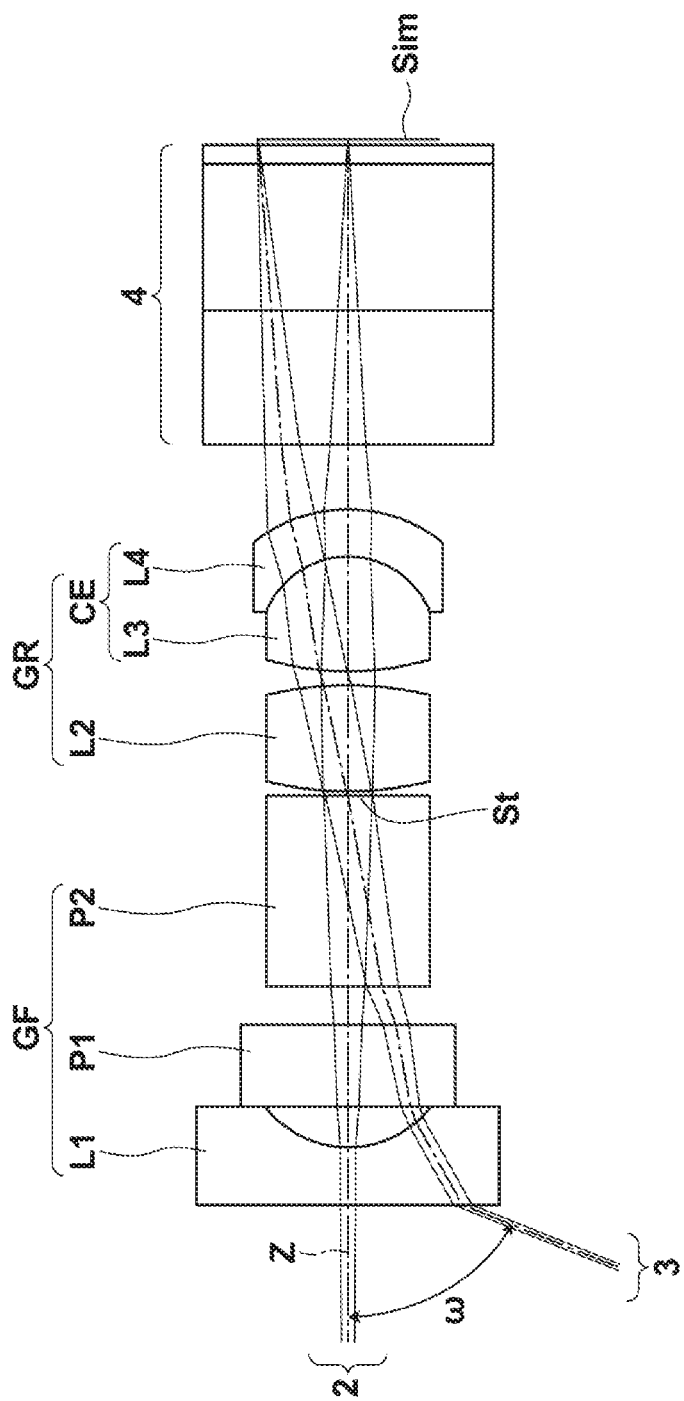
FIG. 2 is a cross sectional diagram that illustrates the configuration of an objective lens for endoscopes of Example 2 of the present disclosure and the paths of light rays that pass therethrough.

It is also possible for the plurality of plane parallel plates within the front group GF to be formed by different materials. The plane parallel plates P1 and P2 illustrated in FIG. 2 are formed by different materials. With respect to a plurality of plane parallel plates formed by different materials, it is possible to change parameters somewhat to adjust various paraxial amounts and various aberrations, to change the thickness of each plane parallel plate.

In this objective lens for endoscopes, it is further preferable for Conditional Formula (4) below to be satisfied.

$$2.5 \text{ mm} < \sum_{i=1}^{k} Ndi \times ti < 6 \text{ mm} \quad (4)$$

wherein the symbols k, i, Ndi, and ti represent the same items as those described above, and mm is millimeters as a unit of length. Conditional Formula (4) includes the unit of length because the amount of absorption of light rays by optical materials is a problem.

By configuring the objective lens for endoscopes such that the value of $$\sum_{i=1}^{k} Ndi \times ti$$

is not less than or equal to the lower limit defined in Conditional Formula (4), the effective diameter of the first lens L1 can be decreased. By configuring the objective lens for endoscopes such that the value of $$\sum_{i=1}^{k} Ndi \times ti$$

is not greater than or equal to the upper limit defined in Conditional Formula (4), the amount of absorption of light rays within the short wavelength range due to coloration by optical materials can be suppressed.

It is more preferable for Conditional Formula (4-1) below to be satisfied, in order to cause the above advantageous effects related to Conditional Formula (4) described above to become more prominent.

$$2.8 \text{ mm} < \sum_{i=1}^{k} Ndi \times ti < 5.5 \text{ mm} \quad (4-1)$$

In addition, in this objective lens for endoscopes, it is preferable for Conditional Formula (5) below to be satisfied.

$$0.8 < \frac{1}{f} \sum_{i=1}^{k} \frac{ti}{Ndi} < 3 \quad (5)$$

wherein the symbols f, k, i, Ndi, and ti represent the same items as those described above.

By configuring the objective lens for endoscopes such that the value of $$\frac{1}{f} \sum_{i=1}^{k} \frac{ti}{Ndi}$$

is not less than or equal to the lower limit defined in Conditional Formula (5), distortion can be favorably corrected. By configuring the objective lens for endoscopes such that the value of $$\frac{1}{f} \sum_{i=1}^{k} \frac{ti}{Ndi}$$

is not greater than or equal to the upper limit defined in Conditional Formula (5), the total length of the lens system can be prevented from becoming excessively long.

It is more preferable for Conditional Formula (5-1) below to be satisfied, in order to cause the above advantageous effects related to Conditional Formula (5) described above to become more prominent.

$$1 < \frac{1}{f} \sum_{i=1}^{k} \frac{ti}{Ndi} < 2 \quad (5-1)$$

Figure 6:
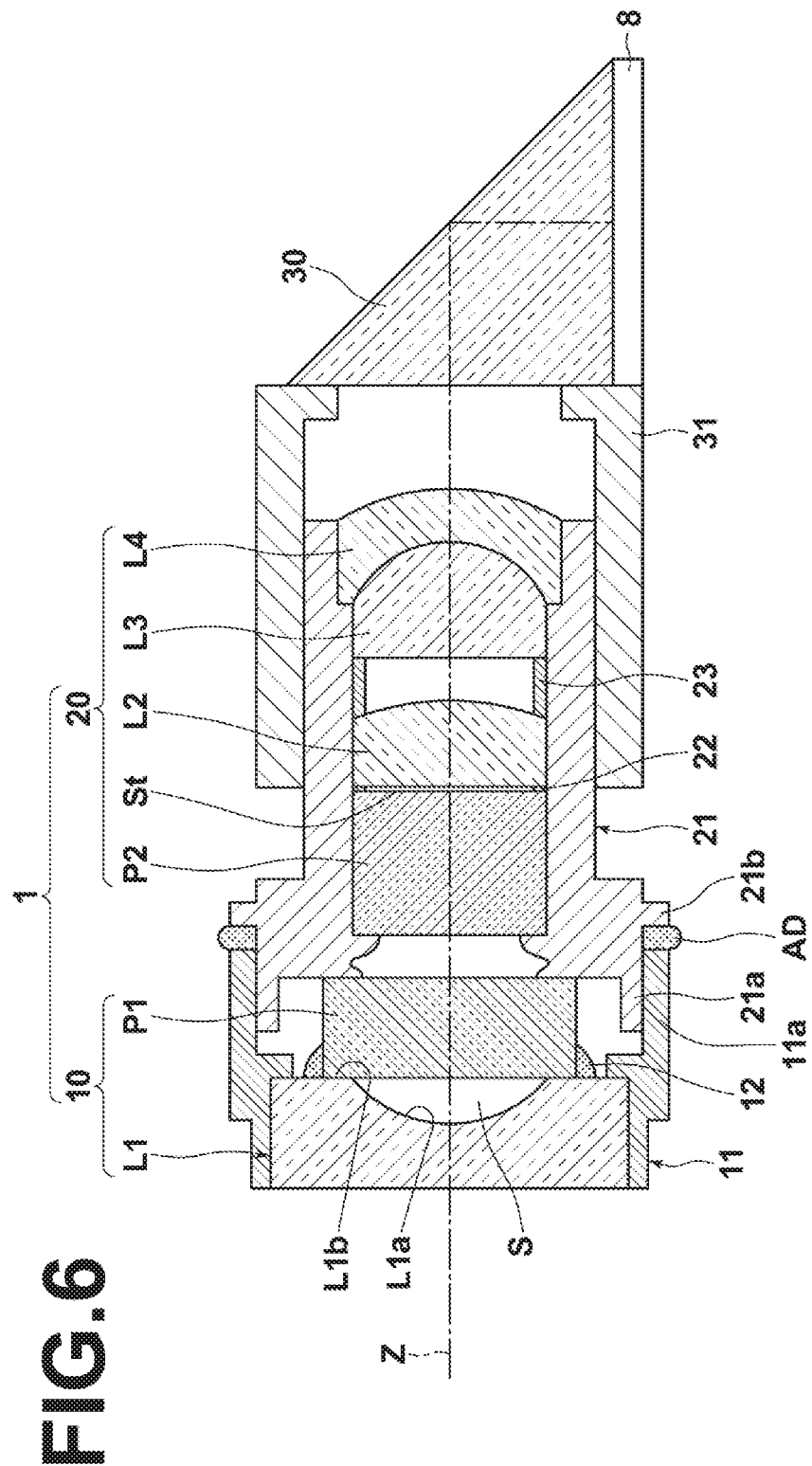
FIG. 6 is a cross sectional diagram that illustrates an example of a configuration in which a portion of the objective lens for endoscopes of FIG. 1 is detachable.

In addition, in this objective lens for endoscopes, it is preferable for the first lens L1 and the plane parallel plate provided most toward the object side to be configured to be separable from optical members toward the image side of the plane parallel plate provided most toward the object side. FIG. 6 is a cross sectional diagram that illustrates an example configured in this manner. The lens configuration of the objective lens for endoscopes illustrated in FIG. 6 is the same as that of the objective lens for endoscopes illustrated in FIG. 1. In FIG. 6, hatching is provided in the first lens L1 through the fourth lens L4 and the plane parallel plates P1 and P2, in order to facilitate understanding.

In the example of FIG. 6, the first lens L1 and the plane parallel plate P1 constitute a first lens unit 10, and the plane parallel plate P2, the aperture stop St, the second lens L2, the third lens L3, and the fourth lens L4 constitute a second lens unit 20. The first lens unit 10 and the second lens unit 20 constitute the objective lens 1 for endoscopes.

The first lens unit 10 is fixed within a first lens barrel 11, and the second lens unit 20 is fixed within a second lens barrel 21. A distance adjusting member 22 is provided between the plane parallel plate P2 and the second lens L2, and a distance adjusting member 23 is provided between the second lens L2 and the third lens L3. The second lens barrel 21 is fixed within a lens barrel 31, an optical path converting prism 30 abuts the end of the third lens barrel 31 toward the image side, and a solid state imaging element 8 is coupled to the light output surface of the optical path converting prism 30. A CCD (Charge Coupled Device), a CMOS (Complementary Metal Oxide Semiconductor), or the like may be employed as the solid state imaging element 8.

An engaging portion 21a toward the object side of the second lens barrel 21 engages with the interior of an engaging portion 11a at the image side of the first lens barrel 11. A flange portion 21b that faces the end of the first lens barrel 11 toward the image side with a gap therebetween is provided at the outer periphery of the second lens barrel 21. The space between the end of the first lens barrel 11 toward the image side and the flange portion 21b is filled with an adhesive agent AD, to adhesively attach the first lens barrel 11 and the second lens barrel 21.

The adhesive agent AD is an adhesive which is capable of being dissolved by external stimulation, such as a solvent, heat, and light. The first lens barrel 11 is separable form the second lens barrel 21. By adopting such a configuration, the first lens unit 10 is separable from the second lens unit 20. In the case that the first lens L1 becomes contaminated or damaged, it is possible for the adhesive agent AD to be dissolved and removed, to remove the first lens barrel 1 from the second lens barrel 21, and to exchange the first lens unit 10 and the first lens barrel 11 as an integral unit.

There is a possibility that the first lens L1, which is provided at the most object side and is exposed to the exterior, will become contaminated or damaged accompanying use. In the case that the first lens L1 becomes contaminated or damaged, if an objective lens for endoscopes is configured integrally such that it is inseparable, the entire objective lens for endoscopes will need to be replaced, and repair costs will be high. In contrast, in the objective lens 1 for endoscopes of the present embodiment, which is configured such that a portion of the optical members toward the object side can be exchanged, costs associated with replacement can be suppressed. The fewer the number of optical members to be replaced, the more advantageous it is from the viewpoint of cost. In the present embodiment, the number of optical members to be replaced is maintained low, by only the first lens L1 and the plane parallel plate P1 being replaced.

Note that there is a possibility that slight eccentricities will arise when coupling a new first lens unit 10 as a replacement to the second lens unit 20. However, one of the two optical members that constitute the first lens unit 10 is a plane parallel plate in the present embodiment. As described previously, the influence imparted onto optical performance by eccentricities of a plane parallel plate is small compared to that imparted by eccentricities of a lens. Therefore, deterioration in optical performance caused by eccentricities during replacement can be reduced compared to a case in which the first lens unit 10 is constituted by two lenses.

In addition, the plane parallel plate P1 seals the image side of the first lens unit 10. Therefore, handling when the first lens unit 10 and the second lens unit 20 are separated as well as cleaning to remove dust and contamination are facilitated. Similarly, the plane parallel plate P2 seals the object side of the second lens unit 20. Therefore, handling when the first lens unit 10 and the second lens unit 20 are separated and maintenance are facilitated. In addition, because the optical member provided most toward the object side within the second lens unit 20 is the plane parallel plate P2, an operator can be prevented from touching the aperture stop St when the first lens unit and the second lens unit 20 are separated.

In the case that the first lens L1 and the plane parallel plate provided most toward the object side are configured to be separable from optical members positioned at the image side of the plane parallel plate provided most toward the object side, it is preferable for the front group GF to have only two plane parallel plates. In such a case, the number of parts can be suppressed to the necessary minimum, while the image side of the first lens L and the object side of the second lens L2 can both be sealed, thereby facilitating handling and maintenance.

Here, it is preferable for the first lens L1 to have a planar portion toward the exterior of the effective diameter thereof in the radial direction and for the planar portion to abut the plane parallel plate provided most toward the object side. The first lens L1 illustrated in FIG. 6 has a planar portion L1b perpendicular to the optical axis Z at the exterior of the concave shaped lens surface L1a in the radial direction. The first lens L1 and the plane parallel plate P1 are adhesively attached by an bonding agent 12 and fixed within the first lens barrel 11 in a state in which the planar portion L1b and the plane parallel plate P1 abut each other in the direction of the optical axis.

In the case that the planar portion L1b of the first lens L1 and the plane parallel plate P1 abut each other in this manner, inclination of the first lens L1 can be prevented, and deterioration in performance caused by production error can be reduced. In addition, in the case that the bonding agent 12 is provided throughout the entire periphery of the planar portion L1b, a space S formed between a lens surface L1a of the first lens L1 toward the image side and the plane parallel plate P1 can be hermetically sealed without employing any other members. The objective lens 1 for endoscopes is cooled by water which is delivered in order to remove contaminants which have adhered to the surface of the first lens L1 toward the object side, for example. By hermetically sealing the space S, entry of moisture into the space S can be suppressed, and the generation of condensation can be suppressed.

In the case that the planar portion L1b of the first lens L and the plane parallel plate P1 abut each other, it is preferable for Conditional Formula (6) below to be satisfied.

$$0.4<(R2-D2)/f<1 \qquad (6)$$

wherein R2 is the radius of curvature of the surface of the first lens toward the image side, and D2 is the air distance between the first lens and the plane parallel plate provided most toward the object side.

If the value of (R2−D2) in Conditional Formula (6) is a value greater than 0, abutment of the planar portion L1b and the plane parallel plate P1 will become possible if the lens surface of the first lens toward the image side is a spherical surface. By configuring the objective lens for endoscopes such that the value of (R2−D2)/f is not less than the lower limit defined in Conditional Formula (6), productivity when causing the surfaces to abut can be improved further, and is advantageous from the viewpoint of cost. By configuring the objective lens for endoscopes such that the value of (R2−D2)/f is not greater than the upper limit defined in Conditional Formula (6), the first lens L1 can have a sufficient refractive power without the surface of the first lens L1 toward the object side having a large amount of refractive power, which is advantageous from the viewpoint of widening the angle of view.

Arbitrary combinations of the preferred configurations and the possible configurations described above are possible. It is preferable for the preferred configurations and possible configurations described above to be selectively adopted as appropriate, according to specifications required of the objective lens for endoscopes. By adopting the configurations described above as appropriate, an objective lens for endoscopes having a compact configuration and a wide angle of view, that suppresses various aberrations including lateral chromatic aberration and has favorable optical performance can be realized. Note that here, a wide angle of view as referred to here means a maximum full angle of view of 130° or greater.

Next, specific examples of numerical values of the objective lens for endoscopes of the present disclosure will be described.

Example 1

The lens configuration of and the paths of light beams through the objective lens for endoscopes of Example 1 are illustrated in FIG. 1. The manner in which the objective lens for endoscopes is illustrated has been described above, and redundant descriptions will be omitted here. Table 1 shows basic lens data of the objective lens for endoscopes of Example 1. In the lens data of Table 1, surface numbers that sequentially increase with the surface of the constituent element most toward the object side being designated as 1 are listed in the column S No.; the radii of curvature of each surface are listed in the column R; and distances along the optical axis Z between each surface and a surface immediately toward the image side thereof are listed in the column D. In addition, refractive indices with respect to the d line (wavelength: 587.6 nm) of each constituent element are listed in the column Nd; and the Abbe's numbers with respect to the d line of each constituent element are listed in the column vd.

The signs of the radii of curvature are positive in cases that the shapes of the surfaces are convex toward the object side, and negative in cases that the shapes of the surfaces are concave toward the object side. The seventh surface in Table 1 is a surface that corresponds to the aperture stop St, and text reading "(St)" is indicated in the surface number column along with the surface number. The thirteenth through sixteenth surfaces in Table 1 are surfaces that correspond to the optical member 4. Among these surfaces, the thirteenth through fifteenth surfaces indicate the optical path converting prism. The value shown in the lowermost row of the column D is the distance between the surface of the optical member 4 toward the image side and the image formation plane Sim.

The object distance (the distance along the optical axis from the surface of the first lens L1 toward the object side to an object) OB, the focal length f of the entire lens system, the back focus Bf as an air converted length, the F number FNo., and the maximum full angle of view 2ω with the d line as a reference are shown above the frame of Table 1. The optical paths illustrated in FIG. 1, the value in the lowermost row of column D in Table 1, and the diagrams that illustrate aberrations to be described later are those for a case in which the object distance is the value shown in Table 1.

In the tables below, degrees are employed as the unit of angles, and mm is employed as the unit of length. However, because optical systems may be proportionately enlarged or reduced and utilized, other appropriate units may be employed. In addition, the tables below show numerical values which are rounded off at a predetermined number of digits.

TABLE 1

Example 1
OB = 6.7 mm, f = 0.73, Bf = 2.20, FNo. = 5.29, 2ω = 135.4°

| S No. | R | D | Nd | vd |
|---|---|---|---|---|
| 1 | ∞ | 0.4500 | 1.88300 | 40.95 |
| 2 | 0.8320 | 0.3200 | | |
| 3 | ∞ | 0.7000 | 1.80518 | 25.42 |
| 4 | ∞ | 0.3000 | | |
| 5 | ∞ | 1.0000 | 1.80518 | 25.42 |
| 6 | ∞ | 0.0000 | | |
| 7 (St) | ∞ | 0.0350 | | |
| 8 | ∞ | 0.6000 | 1.71300 | 53.90 |
| 9 | −1.7090 | 0.3000 | | |
| 10 | ∞ | 0.8100 | 1.71300 | 53.90 |
| 11 | −0.7030 | 0.3700 | 1.92286 | 18.90 |
| 12 | −1.3820 | 0.7191 | | |
| 13 | ∞ | 1.0500 | 1.55920 | 53.92 |
| 14 | ∞ | 1.1500 | 1.55920 | 53.92 |
| 15 | ∞ | 0.1500 | 1.51633 | 64.05 |
| 16 | ∞ | 0.0382 | | |

Figure 7:
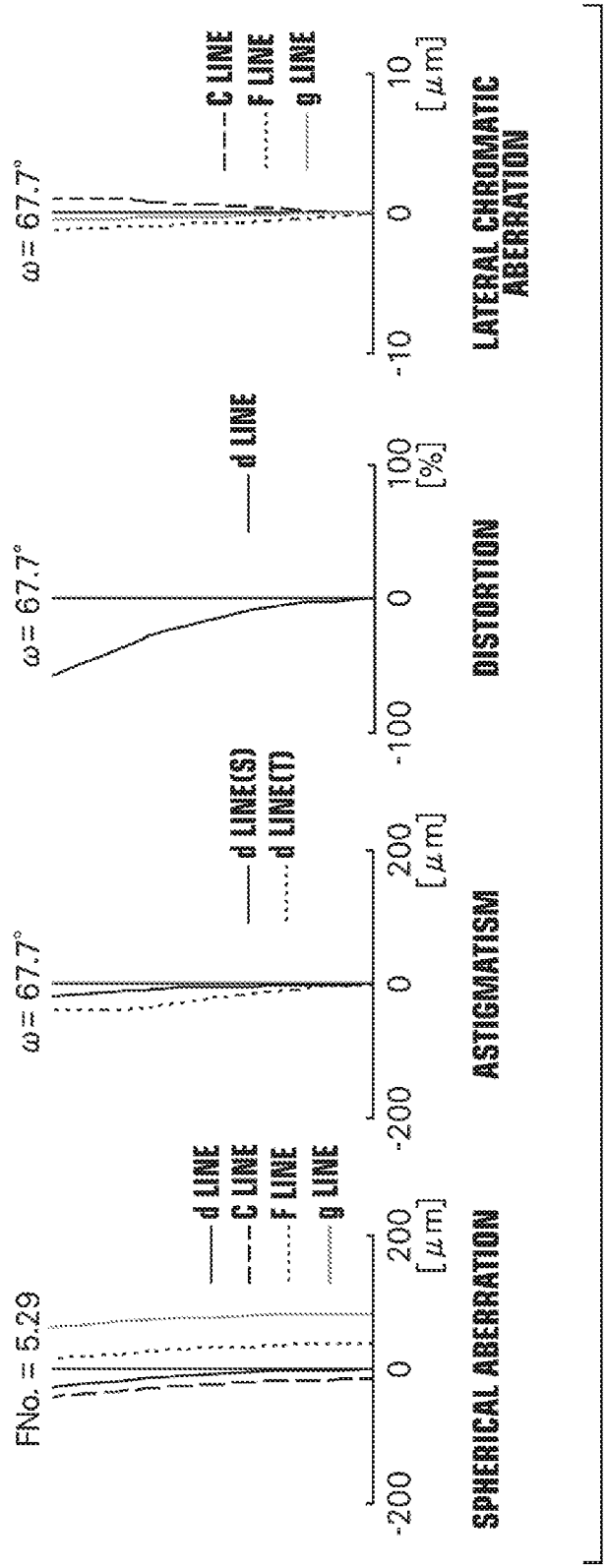
FIG. 7 is a collection of diagrams that illustrate various aberrations of the objective lens for endoscopes of Example 1, which are spherical aberration, astigmatism, distortion, and lateral chromatic aberration in this order from the left side of the drawing sheet.

Diagrams that illustrate spherical aberration, astigmatism, distortion, and lateral chromatic aberration (chromatic aberration of magnification) of the objective lens for endoscopes of Example 1 are illustrated in this order from the left side of the drawing sheet in FIG. 7. The diagram that illustrates spherical aberration show aberrations related to the d line (wavelength: 587.6 nm), the C line (wavelength: 656.3 nm), the F line (wavelength: 486.1 nm) and the g line (wavelength: 435.8 nm), as a black solid line, a long broken line, a short broken line, and a gray solid line, respectively. In the diagram that illustrates astigmatism, aberrations in the sagittal direction and aberrations in the tangential direction related to the d line are indicated by a solid line and a short broken line, respectively. In the diagram that illustrates distortion, aberrations related to the d line are shown as a solid line. In the diagram that illustrates lateral chromatic diagram, aberrations related to the C line, the F line, and the g line are shown as a long broken line, a short broken line, and a gray solid line, respectively. In the diagram that illustrates spherical aberration, "FNo." denotes the F number. In the other diagrams that illustrate the aberrations, ω denotes half angles of view.

The symbols, the meanings, and the manner in which the data are shown in the diagrams related to Example 1 above are the same for the following Examples to be described later, unless particularly noted. Therefore, redundant descriptions will be omitted hereinbelow.

Example 2

Figure 8:
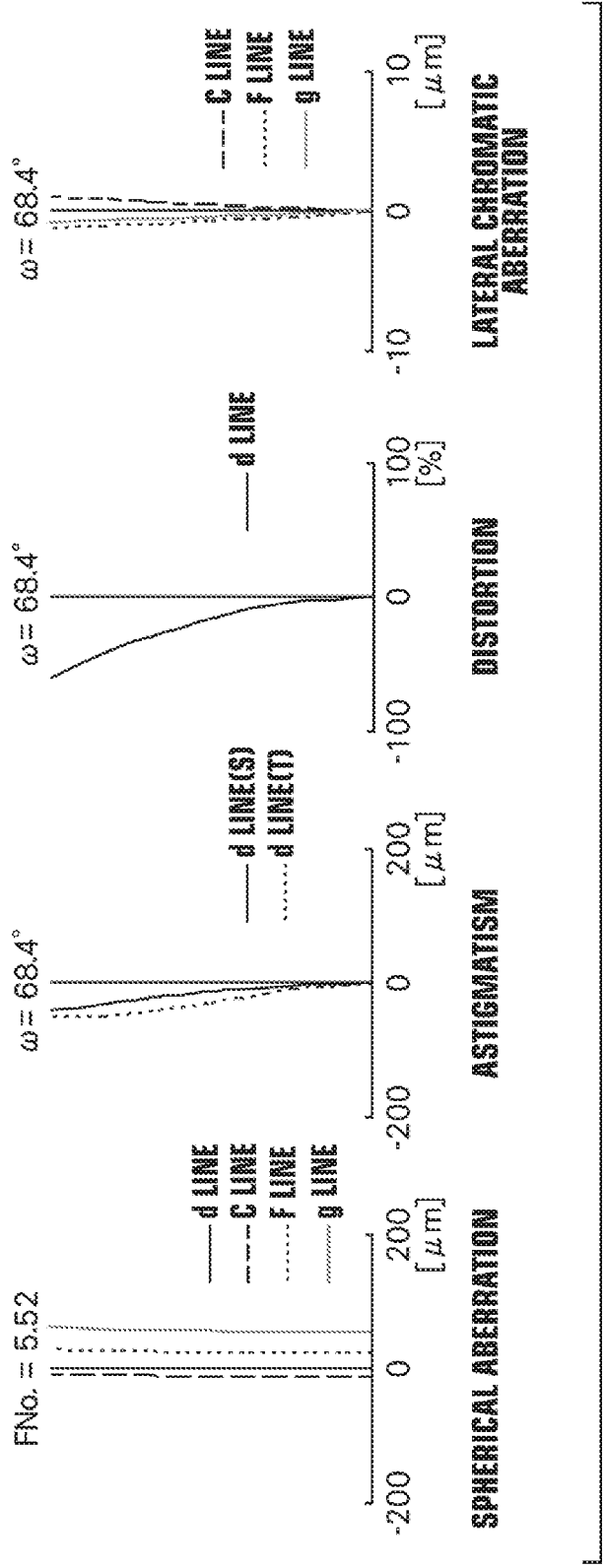
FIG. 8 is a collection of diagrams that illustrate various aberrations of the objective lens for endoscopes of Example 2, which are spherical aberration, astigmatism, distortion, and lateral chromatic aberration in this order from the left side of the drawing sheet.

The lens configuration of and the paths of light beams that pass through the objective lens for endoscopes of Example 2 are illustrated in FIG. 2. Basic lens data of the objective lens for endoscopes of Example 2 are shown in Table 2. Aberration diagrams of the objective lens for endoscopes of Example 2 are illustrated in FIG. 8.

TABLE 2

Example 2
OB = 6.7 mm, f = 0.73, Bf = 2.00, FNo. = 5.52, 2ω = 136.8°

| S No. | R | D | Nd | vd |
|---|---|---|---|---|
| 1 | ∞ | 0.4500 | 1.88300 | 40.95 |
| 2 | 0.8320 | 0.3200 | | |
| 3 | ∞ | 0.6400 | 1.88300 | 40.95 |
| 4 | ∞ | 0.3000 | | |
| 5 | ∞ | 1.5000 | 1.89286 | 20.36 |
| 6 | ∞ | 0.0000 | | |

TABLE 2-continued

Example 2
OB = 6.7 mm, f = 0.73, Bf = 2.00, FNo. = 5.52, 2ω = 136.8°

| S No. | R | D | Nd | vd |
|---|---|---|---|---|
| 7 (St) | ∞ | 0.0350 | | |
| 8 | 2.7836 | 0.8300 | 1.58144 | 40.75 |
| 9 | −2.7836 | 0.1100 | | |
| 10 | 2.3330 | 0.9000 | 1.49700 | 81.54 |
| 11 | −0.7030 | 0.3700 | 1.92286 | 18.90 |
| 12 | −1.2140 | 0.5111 | | |
| 13 | ∞ | 1.0500 | 1.55920 | 53.92 |
| 14 | ∞ | 1.1500 | 1.55920 | 53.92 |
| 15 | ∞ | 0.1500 | 1.51633 | 64.05 |
| 16 | ∞ | 0.0411 | | |

Example 3

Figure 3:
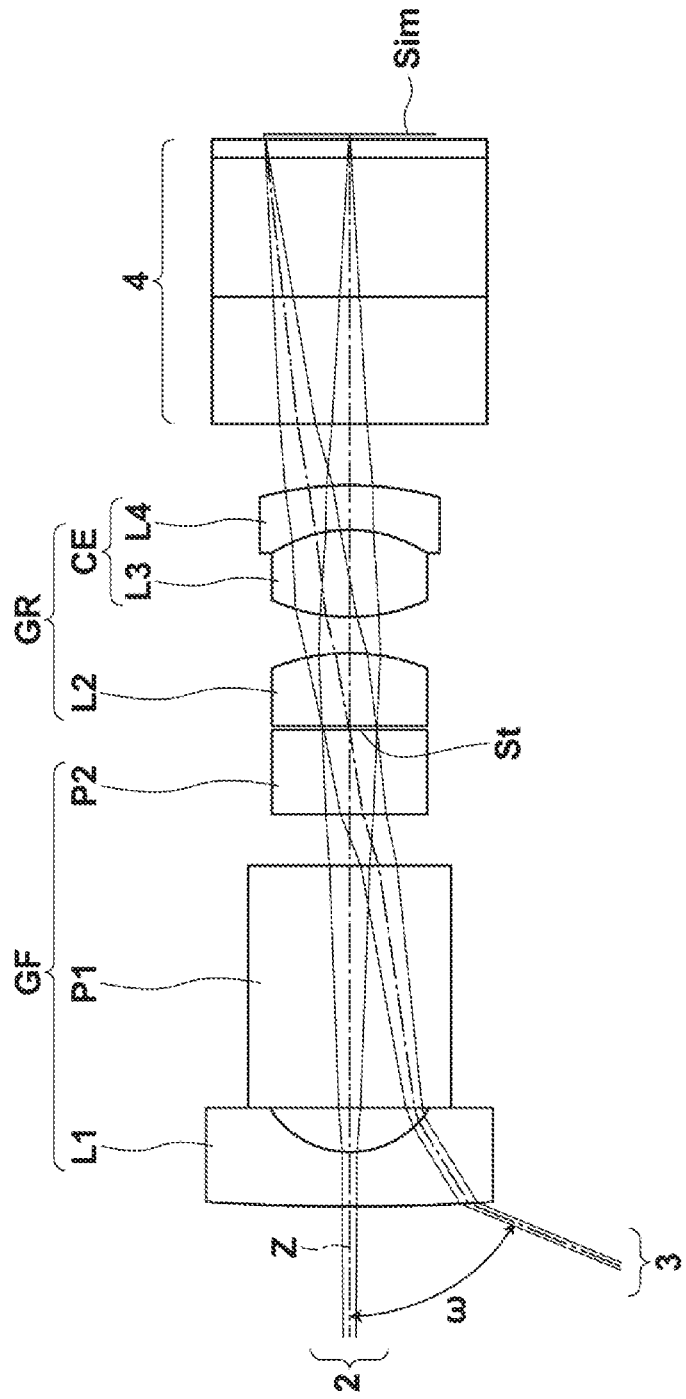
FIG. 3 is a cross sectional diagram that illustrates the configuration of an objective lens for endoscopes of Example 3 of the present disclosure and the paths of light rays that pass therethrough.
Figure 9:
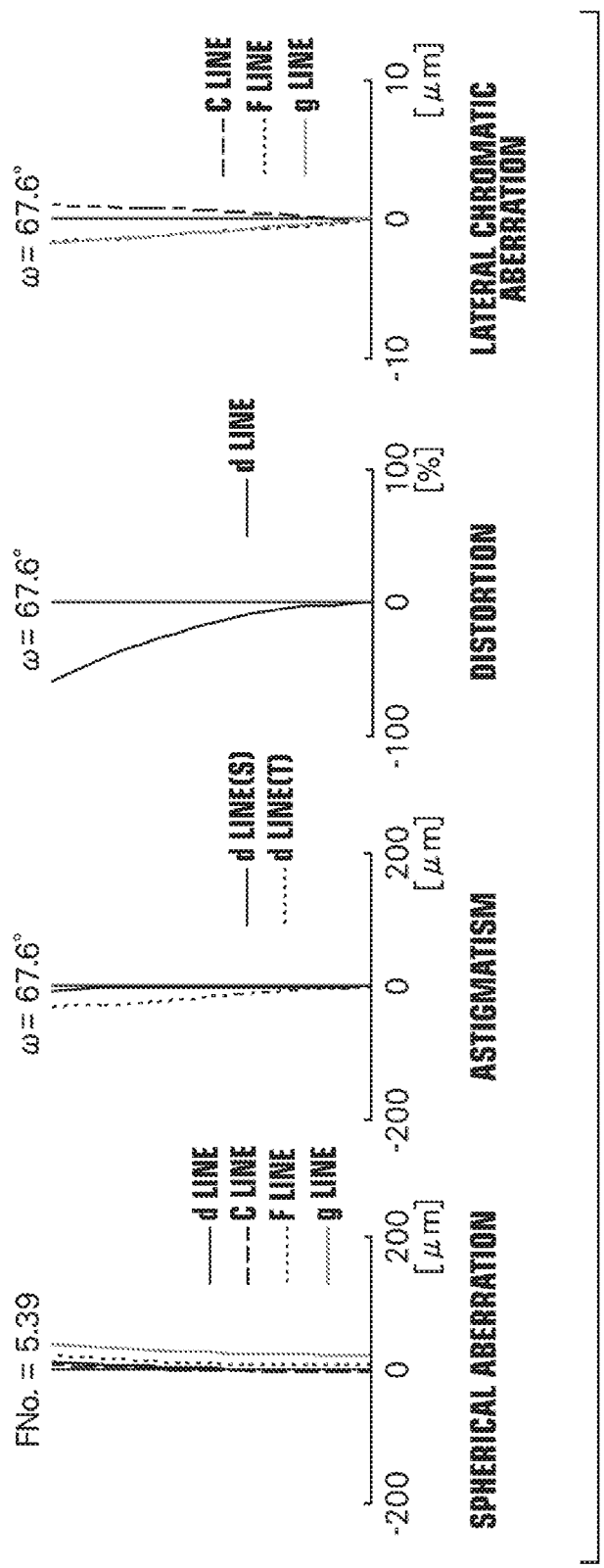
FIG. 9 is a collection of diagrams that illustrate various aberrations of the objective lens for endoscopes of Example 3, which are spherical aberration, astigmatism, distortion, and lateral chromatic aberration in this order from the left side of the drawing sheet.

The lens configuration of and the paths of light beams that pass through the objective lens for endoscopes of Example 3 are illustrated in FIG. 3. Basic lens data of the objective lens for endoscopes of Example 3 are shown in Table 3. Aberration diagrams of the objective lens for endoscopes of Example 3 are illustrated in FIG. 9.

TABLE 3

Example 3
OB = 6.7 mm, f = 0.73, Bf = 2.00, FNo. = 5.39, 2ω = 135.2°

| S No. | R | D | Nd | vd |
|---|---|---|---|---|
| 1 | 18.2195 | 0.4500 | 1.88300 | 40.95 |
| 2 | 0.7914 | 0.3700 | | |
| 3 | ∞ | 2.0000 | 2.00330 | 28.27 |
| 4 | ∞ | 0.4236 | | |
| 5 | ∞ | 0.7000 | 1.89286 | 20.36 |
| 6 | ∞ | 0.0000 | | |
| 7 (St) | ∞ | 0.0350 | | |
| 8 | ∞ | 0.6000 | 1.69895 | 30.13 |
| 9 | −1.7813 | 0.3000 | | |
| 10 | 1.5842 | 0.7200 | 1.49700 | 81.54 |
| 11 | −1.1904 | 0.3700 | 1.92286 | 18.90 |
| 12 | −2.8769 | 0.5111 | | |
| 13 | ∞ | 1.0500 | 1.55920 | 53.92 |
| 14 | ∞ | 1.1500 | 1.55920 | 53.92 |
| 15 | ∞ | 0.1500 | 1.51633 | 64.05 |
| 16 | ∞ | 0.0429 | | |

Example 4

Figure 4:
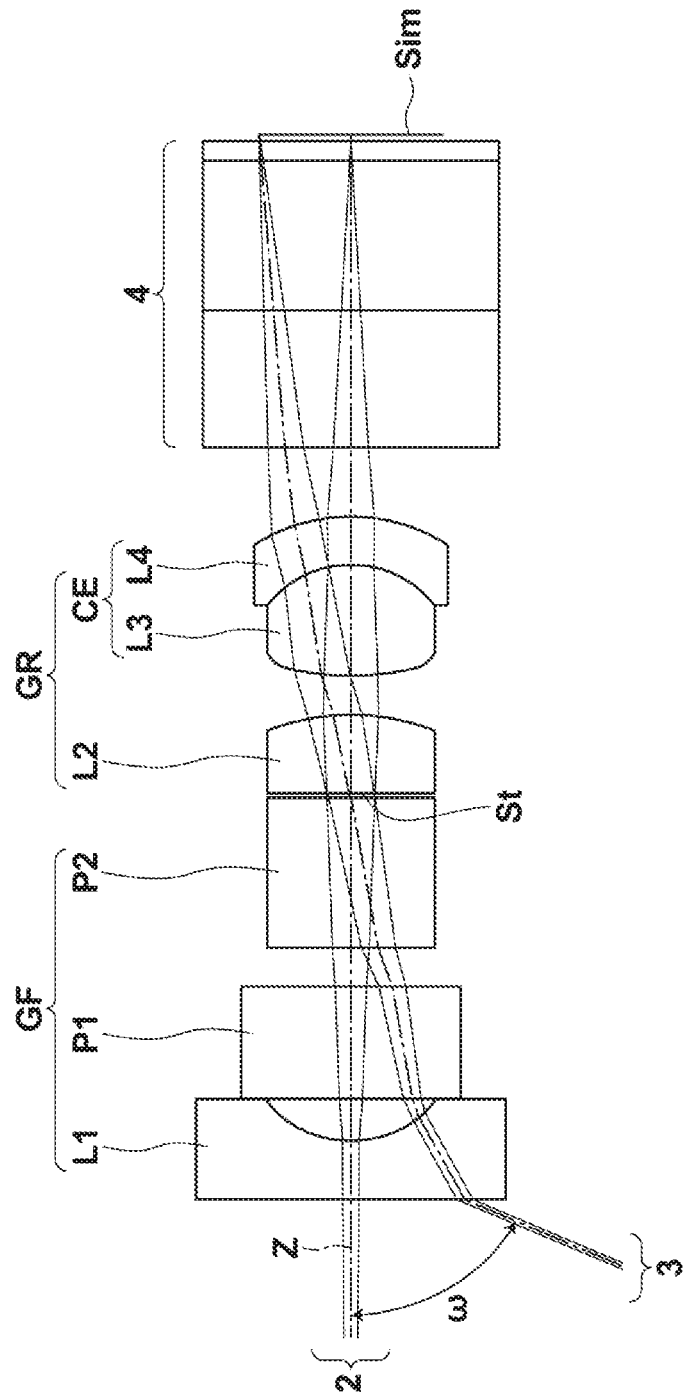
FIG. 4 is a cross sectional diagram that illustrates the configuration of an objective lens for endoscopes of Example 4 of the present disclosure and the paths of light rays that pass therethrough.
Figure 10:
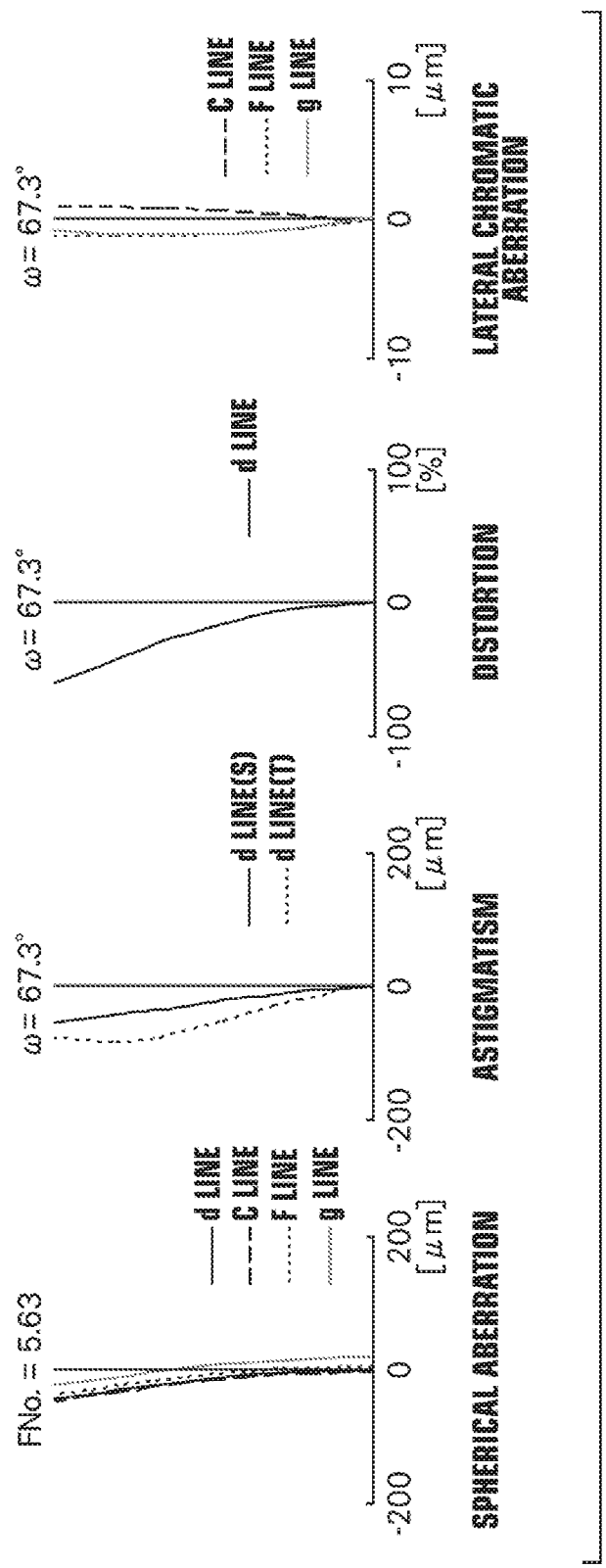
FIG. 10 is a collection of diagrams that illustrate various aberrations of the objective lens for endoscopes of Example 4, which are spherical aberration, astigmatism, distortion, and lateral chromatic aberration in this order from the left side of the drawing sheet.

The lens configuration of and the paths of light beams that pass through the objective lens for endoscopes of Example 4 are illustrated in FIG. 4. Basic lens data of the objective lens for endoscopes of Example 4 are shown in Table 4. Aberration diagrams of the objective lens for endoscopes of Example 4 are illustrated in FIG. 10. In table 4, surfaces of which the surface numbers are appended with the "*" are aspherical surfaces, and numerical values for paraxial radii of curvature are shown in the column of radii of curvature. Table 5 shows the aspherical surface coefficients of these aspherical surfaces. "E−n" (n is an integer) in the numerical values for aspherical surface coefficients in Table 5 mean "·10$^{-n}$". The aspherical surface coefficients are the values of coefficients KA and Am (m=4, 6, 8, 10) in an aspherical surface formula represented by the formula below.

$$Zd = \frac{C \times h^2}{1 + \sqrt{1 - KA \times C^2 \times h^2}} + \sum_m Am + h^m$$

wherein Zd is the depth of the aspherical surface (the length of a normal line from a point on an aspherical surface at a height h to a plane perpendicular to the optical axis that contacts the peak of the aspherical surface), h is the height (the distance from the optical axis to the surface of the lens), C is the paraxial curvature, and KA and Am are aspherical surface coefficients (m-=4, 6, 8, 10).

TABLE 4

Example 4
OB = 6.7 mm, f = 0.79, Bf = 2.01, FNo. = 5.63, 2ω = 134.6°

| S No. | R | D | Nd | vd |
|---|---|---|---|---|
| 1 | ∞ | 0.4500 | 1.88300 | 40.95 |
| *2 | 0.9128 | 0.3200 | | |
| 3 | ∞ | 0.8600 | 1.89286 | 20.36 |
| 4 | ∞ | 0.3000 | | |
| 5 | ∞ | 1.1500 | 1.89286 | 20.36 |
| 6 | ∞ | 0.0000 | | |
| 7 (St) | ∞ | 0.0350 | | |
| 8 | ∞ | 0.6000 | 1.69895 | 30.13 |
| 9 | −1.7856 | 0.3000 | | |
| *10 | 2.2913 | 0.8500 | 1.49700 | 81.54 |
| 11 | −0.8333 | 0.3700 | 1.92286 | 18.90 |
| 12 | −1.4005 | 0.5285 | | |
| 13 | ∞ | 1.0500 | 1.55920 | 53.92 |
| 14 | ∞ | 1.1500 | 1.55920 | 53.92 |
| 15 | ∞ | 0.1500 | 1.51633 | 64.05 |
| 16 | ∞ | 0.0484 | | |

TABLE 5

Example 4

| | S No. | |
|---|---|---|
| | 2 | 10 |
| KA | 1.0000000E+00 | 1.0000000E+00 |
| A4 | 3.4330990E−02 | 9.4958424E−02 |
| A6 | 4.7600102E−01 | 1.9887186E−01 |
| A8 | −9.5719219E−01 | −5.6841522E+00 |
| A10 | 2.0261452E+00 | 1.6851212E+01 |

Example 5

Figure 11:
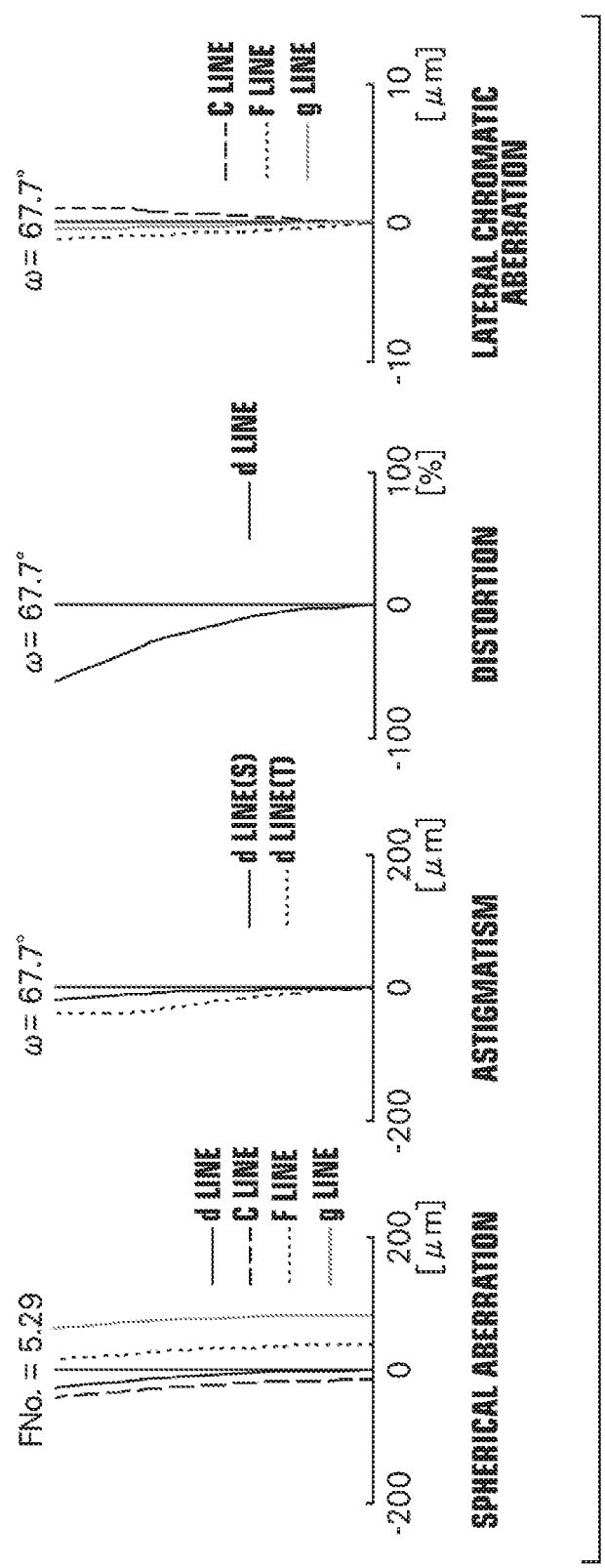
FIG. 11 is a collection of diagrams that illustrate various aberrations of the objective lens for endoscopes of Example 5, which are spherical aberration, astigmatism, distortion, and lateral chromatic aberration in this order from the left side of the drawing sheet.

The lens configuration of and the paths of light beams that pass through the objective lens for endoscopes of Example 5 are illustrated in FIG. 5. A first lens L1 through a fourth lens L4 of Example 5 are the same as those of Example 1, but Example employs a single plane parallel plate P12 instead of the two plane parallel plates P1 and P2 of Example 1. Basic lens data of the objective lens for endoscopes of Example are shown in Table 6. Aberration diagrams of the objective lens for endoscopes of Example 5 are illustrated in FIG. 11.

TABLE 6

Example 5
OB = 6.7 mm, f = 0.73, Bf = 2.20, FNo. = 5.29, 2ω = 135.4°

| S No. | R | D | Nd | vd |
|---|---|---|---|---|
| 1 | ∞ | 0.4500 | 1.88300 | 40.95 |
| 2 | 0.8320 | 0.3200 | | |

TABLE 6-continued

Example 5
OB = 6.7 mm, f = 0.73, Bf = 2.20, FNo. = 5.29, 2ω = 135.4°

| S No. | R | D | Nd | vd |
|---|---|---|---|---|
| 3 | ∞ | 1.7000 | 1.80518 | 25.42 |
| 4 | ∞ | 0.3000 | | |
| 5 (St) | ∞ | 0.0350 | | |
| 6 | ∞ | 0.6000 | 1.71300 | 53.90 |
| 7 | −1.7090 | 0.3000 | | |
| 8 | ∞ | 0.8100 | 1.71300 | 53.90 |
| 9 | −0.7030 | 0.3700 | 1.92286 | 18.90 |
| 10 | −1.3820 | 0.7191 | | |
| 11 | ∞ | 1.0500 | 1.55920 | 53.92 |
| 12 | ∞ | 1.1500 | 1.55920 | 53.92 |
| 13 | ∞ | 0.1500 | 1.51633 | 64.05 |
| 14 | ∞ | 0.0382 | | |

Table 7 shows values corresponding to Conditional Formulae (1) through (6) for the objective lenses for endoscopes of Examples 1 through 5. The data shown in Table 7 are those with respect to the d line.

TABLE 7

| Formula | | Example 1 | Example 2 | Example 3 | Example 4 | Example 5 |
|---|---|---|---|---|---|---|
| (1) | $1/f \times \Sigma[\{ti \times (Ndi - 1)\}/vdi]$ | 0.054 | 0.080 | 0.102 | 0.088 | 0.054 |
| (2) | f/f1 | −0.774 | −0.776 | −0.769 | −0.767 | −0.774 |
| (3) | Dsc/RC | −2.482 | −2.667 | −1.390 | −2.142 | −2.482 |
| (4) | $\Sigma(Ndi \times ti)$ | 3.069 | 4.044 | 5.332 | 3.805 | 3.069 |
| (5) | $1/f \times \Sigma(ti/Ndi)$ | 1.291 | 1.548 | 1.875 | 1.340 | 1.291 |
| (6) | (R2 − D2)/f | 0.702 | 0.700 | 0.577 | 0.748 | 0.702 |

As can be understood from the above data, each of the objective lenses for endoscopes of Examples 1 through 5 only has four lenses and includes one or two plane parallel plates in the entire lens system, and is configured to be compact. The full angles of view thereof are within a range from 130° to 140°, that is, lens systems having wide angles of view are realized. At the same time, various aberrations including lateral chromatic aberration are favorably corrected, and high optical performance is achieved.

Figure 12:
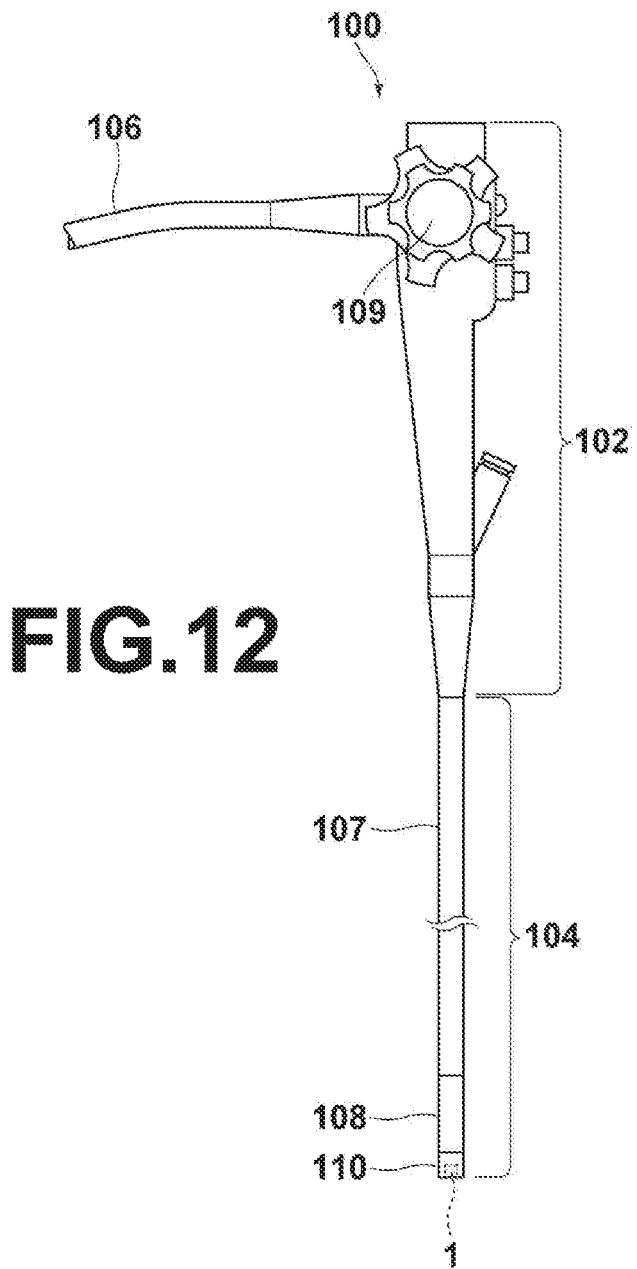
FIG. 12 is a diagram that illustrates the schematic structure of an endoscope according to an embodiment of the present disclosure.

Next, an embodiment of an endoscope to which the objective lens for endoscopes of the present disclosure is applied will be described with reference to FIG. 12. FIG. 12 illustrates the schematic structure of the entire endoscope. The endoscope 100 illustrated in FIG. 12 is mainly equipped with an operating portion 102, an insertion portion 104, and a universal cord 106 to be connected to a connector portion (not shown). The majority of the insertion portion 104 is a flexible portion 107 which can be bent in desired directions along an insertion path. A bendable portion 108 is linked to the leading end of the flexible portion 107, and a leading end portion 110 is linked to the leading end of the bendable portion 108. The bendable portion 108 is provided to orient the leading end portion 110 in desired directions. Bending operations are enabled by rotating a bending operation knob 109 provided on the operating portion 102. An objective lens 1 for endoscopes according to an embodiment of the present disclosure is provided within the interior of the leading end portion 110. Note that the objective lens for endoscopes 1 is schematically illustrated in FIG. 12. The endoscope of the present embodiment is equipped with the objective lens 1 for endoscopes. Therefore, miniaturization of the leading end portion 110 can be achieved, and favorable images can be obtained with a wide angle of view.

The present disclosure has been described with reference to the embodiments and Examples. However, the present disclosure is not limited to the above embodiments and Examples, and various modifications are possible. For example, the numerical values of the radii of curvature, the distances among surfaces, the refractive indices, the Abbe's numbers, and the aspherical surface coefficients of each lens are not limited to those exemplified in the above Examples, and may be different values. Similarly, the number, thicknesses, and the refractive indices of the plane parallel plates within the front group GF are not limited to the values shown in the Examples above, and may be different values.

In addition, a configuration in which the first lens L1 and the plane parallel plate provided most toward the object side are separable from the other optical members was described with reference to FIG. 6. However, the mechanical members which are employed in this configuration are not limited to those of the above embodiment, and various modifications thereto are possible.

What is claimed is:

1. An objective lens for endoscopes consisting of, in order from the object side to the image side:
   a front group;
   an aperture stop; and
   a rear group having a positive refractive power as a whole;
   the front group consisting of; in order from the object side to the image side, a first lens having a negative refractive power, in which the absolute value of the radius of curvature of the surface toward the image side thereof is less than the absolute value of the radius of curvature of the surface toward the object side thereof, and at least one plane parallel plate;
   the rear group consisting of, in order from the object side to the image side, a second lens having a positive refractive power, a third lens having a positive refractive power, and a fourth lens having a negative refractive power;
   the third lens and the fourth lens being cemented together to constitute a cemented lens;
   the coupling surface of the cemented lens being convex toward the image side; and
   all of Conditional Formulae (1) through (3) below being satisfied:

$$0.045 < \frac{1}{f}\sum_{i=1}^{k} \frac{ti \times (Ndi - 1)}{vdi} < 0.15 \quad (1)$$

$$-0.9 < f/fl < -0.5 \quad (2)$$

$$-2.9 < Dsc/RC < -1 \quad (3)$$

wherein f is the focal length of the entire lens system, k is the total number of plane parallel plates within the front group, i is a natural number within a range from 1 to k, ti is the thickness of an ith plane parallel plate from the object side within the front group, Ndi is the refractive index with respect to the d line of an ith plane parallel plate from the object side within the front group, vdi is the Abbe's number with respect to the d line of an ith plane parallel plate from the object side within the front group, fl is the focal length of the first lens, Dsc is the distance along the optical axis from the aperture stop to the coupling surface of the cemented lens, and RC is the radius of curvature of the coupling surface of the cemented lens.

2. An objective lens for endoscopes as defined in claim 1, in which Conditional Formula (1-1) below is satisfied:

$$0.05 < \frac{1}{f}\sum_{i=1}^{k} \frac{ti \times (Ndi-1)}{vdi} < 0.12 \qquad (1\text{-}1)$$

3. An objective lens for endoscopes as defined in claim 1, in which Conditional Formula (2-1) below is satisfied:

$$-0.8 < f/\mathrm{fl} < -0.6 \qquad (2\text{-}1).$$

4. An objective lens for endoscopes as defined in claim 1, in which Conditional Formula (3-1) below is satisfied:

$$-2.7 < Dsc/RC < -1.2 \qquad (3\text{-}1).$$

5. An endoscope equipped with an objective lens for endoscopes as defined in claim 1.

6. An objective lens for endoscopes as defined in claim 1, in which Conditional Formula (4) below is satisfied:

$$2.5 \text{ mm} < \sum_{i=1}^{k} Ndi \times ti \times 6 \text{ mm} \qquad (4)$$

wherein mm is millimeters as a unit of length.

7. An objective lens for endoscopes as defined in claim 6, in which Conditional Formula (4-1) below is satisfied:

$$2.8 \text{ mm} < \sum_{i=1}^{k} Ndi \times ti \times 5.5 \text{ mm}. \qquad (4\text{-}1)$$

8. An objective lens for endoscopes as defined in claim 1, in which Conditional Formula (5) below is satisfied:

$$0.8 < \frac{1}{f}\sum_{i=1}^{k} \frac{ti}{Ndi} < 3. \qquad (5)$$

9. An objective lens for endoscopes as defined in claim 8, in which Conditional Formula (5-1) below is satisfied:

$$1 < \frac{1}{f}\sum_{i=1}^{k} \frac{ti}{Ndi} < 2. \qquad (5\text{-}1)$$

10. An objective lens for endoscopes as defined in claim 1, wherein:

the first lens and the plane parallel plate provided most toward the object side is configured to be separable from optical members toward the image side of the plane parallel plate provided most toward the object side.

11. An objective lens for endoscopes as defined in claim 10, wherein:

the first lens has a planar portion;

the planar portion abuts the plane parallel plate provided most toward the object side in the direction of the optical axis.

12. An objective lens for endoscopes as defined in claim 10, wherein:

only two plane parallel plates are included in the front group.

13. An objective lens for endoscopes as defined in claim 11, in which Conditional Formula (6) below is satisfied:

$$0.4 < (R2-D2)/f < 1 \qquad (6)$$

wherein R2 is the radius of curvature of the lens surface of the first lens toward the image side, and D2 is the air distance along the optical axis between the first lens and the plane parallel plate provided most toward the object side.

14. An objective lens for endoscopes as defined in claim 13, in which Conditional Formula (6-1) below is satisfied:

$$0.5 < (R2-D2)/f < 0.85 \qquad (6\text{-}1)$$

* * * * *